United States Patent
Ishii et al.

(10) Patent No.: US 6,554,438 B2
(45) Date of Patent: Apr. 29, 2003

(54) HIGH PERFORMANCE, LOW COST MIRROR FOR A REAR PROJECTION TELEVISION

(75) Inventors: Fusao Ishii, Pittsburgh, PA (US); Joseph A. Marcanio, Greensburg, PA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 09/892,955

(22) Filed: Jun. 27, 2001

(65) Prior Publication Data

US 2002/0060866 A1 May 23, 2002

Related U.S. Application Data

(62) Division of application No. 09/716,081, filed on Nov. 17, 2000.

(51) Int. Cl.[7] .............................................. G02B 7/182
(52) U.S. Cl. ...................... 359/883; 359/884; 359/847; 359/846
(58) Field of Search ................................ 359/883, 884, 359/847, 846, 848, 871, 872, 267, 268, 265, 584, 360, 585, 838

(56) References Cited

U.S. PATENT DOCUMENTS

| | | | | |
|---|---|---|---|---|
| 4,963,012 A | * | 10/1990 | Tracy et al. ................. | 350/641 |
| 5,124,858 A | * | 6/1992 | Goetz ........................... | 248/469 |
| 5,222,000 A | * | 6/1993 | Adler ........................... | 359/847 |
| 5,464,693 A | * | 11/1995 | Ono et al. .................... | 428/344 |
| 5,790,298 A | * | 8/1998 | Tonar ........................... | 359/267 |
| 5,798,881 A | * | 8/1998 | Mazurek et al. ............. | 359/872 |
| 6,078,425 A | * | 6/2000 | Wolfe et al. ................. | 359/584 |
| 6,086,210 A | * | 7/2000 | Krisko et al. ................ | 359/883 |

* cited by examiner

*Primary Examiner*—Mohammad Sikder
(74) *Attorney, Agent, or Firm*—Mayer Fortkort & Williams, PC; Stuart H. Mayer, Esq.; Karin L. Williams, Esq.

(57) ABSTRACT

A video projection device includes a cabinet having front and rear sections and a projection tube for projecting a video image. The video projection device also includes a screen located in the front section of the cabinet. The screen has a first surface onto which the video image is projected and a second surface for displaying the video image so that it is observable by a viewer. A mirror is arranged in the cabinet for reflecting light to the first surface of the screen. The mirror is a composite laminate mirror that includes a rigid substrate and a reflective sheet laminated to the rigid substrate. The rigid substrate may be a glass substrate and the reflective sheet may be a flexible plastic sheet. The reflective sheet may have a multilayer construction that includes a metallic film. The reflective sheet may alternatively include a second substrate and at least one thin film layer deposited on the substrate.

26 Claims, 2 Drawing Sheets

HIGH PERFORMANCE, LOW COST MIRROR FOR A REAR PROJECTION TELEVISION

CROSS-REFERENCE TO RELATED APPLICATIONS

This Application is a division of co-pending U.S. patent application Ser. No. 09/716,081, filed Nov. 17, 2000 entitled "High Performance, Low Cost Mirror For A Rear Projection Television".

BACKGROUND OF THE INVENTION

Rear projection type television receivers are very popular due to the large display screens that are available for the enjoyment of the user without necessitating special installations and/or large viewing areas. In such receivers, three color cathode ray tubes (red, green and blue) project an image onto a mirror, with the image being reflected (and magnified onto a display screen. The large mirrors, which can be on the order of 40×30 inches, are not only expensive, but heavy.

Recently, some rear projection television receiver mirrors have been fabricated of a metallized plastic film that is tightly stretched and secured to a relatively light-weight aluminum frame. For example, as discussed in U.S. Pat. No. 5,896,236, a trapezoidal shape, U-shaped frame is secured to a cabinet (at an appropriate angle) by brackets at its corners, or by welding. A rigid backing, in the form of about a one-half inch thick sheet of styrofoam is secured int the frame very close to the metallized plastic film. The metallized plastic film is stretched, wrapped around the frame and secured to both the backing and to the back of the frame by an adhesive. The excess metallized plastic film is trimmed and the assembly is subjected to heat for a short time to cause the stretched metallized plastic film to shrink somewhat. Suitable mounting brackets are affixed to the frame. A major drawback of such a mirror is that it is relatively expensive to manufacture because it is labor intensive, since the adhesive is manually applied and the metallized plastic film is hand-wrapped about the frame. Moreover, the resultant mirror often exhibits deformations due to wrinkling of the metallized plastic film unless the hand-wrapping is carefully done.

Accordingly, it would be desirable to provide a mirror for a rear projection television receiver that is lightweight and simple to manufacture.

SUMMARY OF THE INVENTION

In accordance with the present invention, a composite laminate mirror is provided. The mirror includes a rigid substrate and a reflective sheet laminated to the rigid substrate.

In accordance with one aspect of the invention, the rigid substrate is a glass substrate.

In accordance with another aspect of the invention, the reflective sheet is a flexible plastic sheet. The reflective sheet may have a multilayer construction that includes a metallic film such as Mylar™, for example.

In accordance with another aspect of the invention, the reflective sheet includes a second substrate and at least one thin film layer deposited on the substrate. The second substrate may be a metallic sheet such as a rolled metal sheet. Alternatively, the second substrate may be a plastic sheet.

In accordance with yet another aspect of the invention, the thin film layer includes a silver layer.

In accordance with another aspect of the invention, a thin film silicon dioxide layer is deposited on the substrate. Additionally, a passivating layer such as silicon nitride may be deposited on the silicon dioxide layer. A thin film silver layer may be deposited over the passivating layer.

The present invention also provides a video projection device that includes a cabinet having front and rear sections and a projection tube for projecting a video image. The video projection device also includes a screen located in the front section of the cabinet. The screen has a first surface onto which the video image is projected and a second surface for displaying the video image so that it is observable by a viewer. A mirror is arranged in the cabinet for reflecting light to the first surface of the screen. The mirror is a composite laminate mirror that includes a rigid substrate and a reflective sheet laminated to the rigid substrate.

BRIEF DESCRIPTION OF THE INVENTION

DETAILED DESCRIPTION

Figure 1:
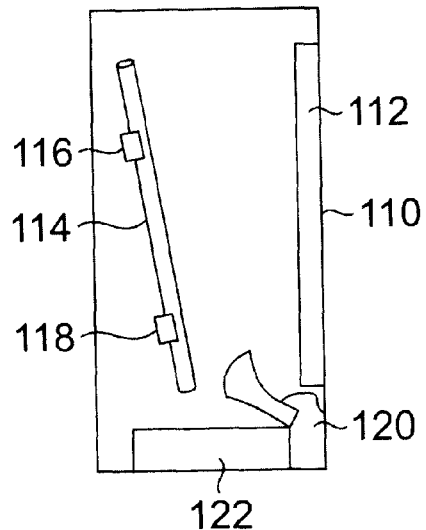
FIG. 1 is a schematic diagram of a prior art rear projection type television receiver.

Referring to FIG. 1, a typical prior art rear projection type television receiver includes a cabinet 110, a viewing screen 112, a projection mirror 14, positioned at an angle to the viewing screen 112, and a set of cathode ray tubes 120 (only one of which is shown) for projecting a televised image onto mirror 114. Mirror 114 includes a plurality of support brackets 116 and 118 for supporting it with the appropriate attitude within structure (not illustrated) in the television receiver. A chassis 122 supplies operating voltages and video information to cathode ray tubes 120 by well known means for generating a video display that is reflected by mirror 114 onto viewing screen 112. The viewing screen may take any of a well known number of forms, such as a fresnel type screen, for example. An important advantage of rear projection type television receivers is the very favorable ratio of viewing screen area to depth of the television receiver cabinet.

Figure 2:
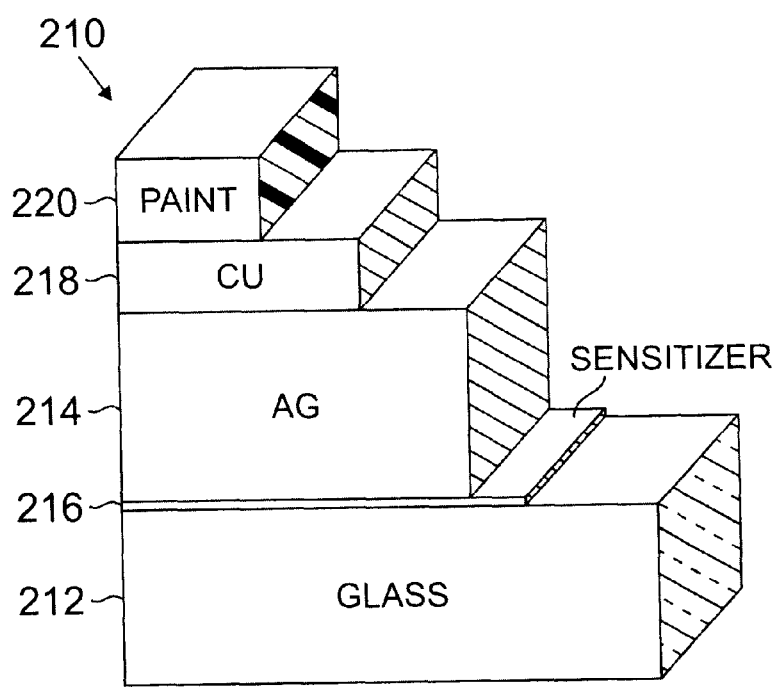
FIG. 2 is a cross-sectional view of a conventional mirror structure employed in a television receiver such as shown in FIG. 1.

FIG. 2 shows a conventional mirror structure 210 of the type typically employed in the television receiver of FIG. 1. The structure 210 includes a bulk glass substrate 212 with a layer of silver (Ag) 214 coated on the glass substrate surface. A sensitizer 216, usually consisting of a tin chloride, water, and hydrochloric acid solution, is deposited on the surface of the glass substrate 212 prior to the silver to enhance adhesion of the silver layer 214 to the glass substrate 212. A paint layer 220 is coated over the mirror in an attempt to protect the mirror from the environment. However, paint layer 220 does not adhere very well to the silver layer 214. Therefore, a thin copper (Cu) layer 18 is first deposited on the silver layer 214, and the paint layer 220 is coated over the copper layer 218. The copper layer 218 also shields the silver layer 214 to some extent from the deleterious chemical degradation of the silver that could otherwise result from the components and impurities in the paint layer 220. The reflectivity of a mirror structure 210 suitable for a rear projection television receiver is typically 85–90%. As discussed above, mirror structure 210 is large, heavy and expensive.

Another mirror structure that avoids the use of a bulk glass substrate employs a plastic mirror that is wrapped about a frame. For example, in U.S. Pat. No. 5,896,236, a heat-shrunk metallized plastic film is stretched around a U-shaped aluminum frame. As previously mentioned, such a mirror is expensive to manufacture.

In accordance with the present invention, a flexible mirror sheet is laminated to a relatively thin substrate of bulk glass. While other substrates such as plastic may be employed, glass is advantageous because it is flat and inexpensive. The glass substrate provides rigidity and support, eliminating the need for a frame. The substrate also prevents the deformations than can arise due to wrinkling when a plastic mirror is placed in a frame. However, the glass substrate may be substantially thinner than can be achieved when a conventional mirror is formed from a glass substrate coated with a silver layer, such as shown in FIG. 2. A thinner substrate can be employed because the flexible metal sheet strengthens the glass substrate, which provides the same impact resistance as a thicker glass substrate that is not laminated in this manner. Accordingly, the inventive mirror achieves the primary benefits of both a conventional glass mirror and a flexible plastic mirror without the use of either a thick glass substrate or a frame.

The present invention also achieves other advantages relative to conventional mirrors. For example, since the glass substrate need not be of optical quality, relatively inexpensive glass may be used in the present invention. Additionally, the glass substrate is strengthened by the application of the plastic sheet and is therefore less susceptible to breakage.

Figure 3:
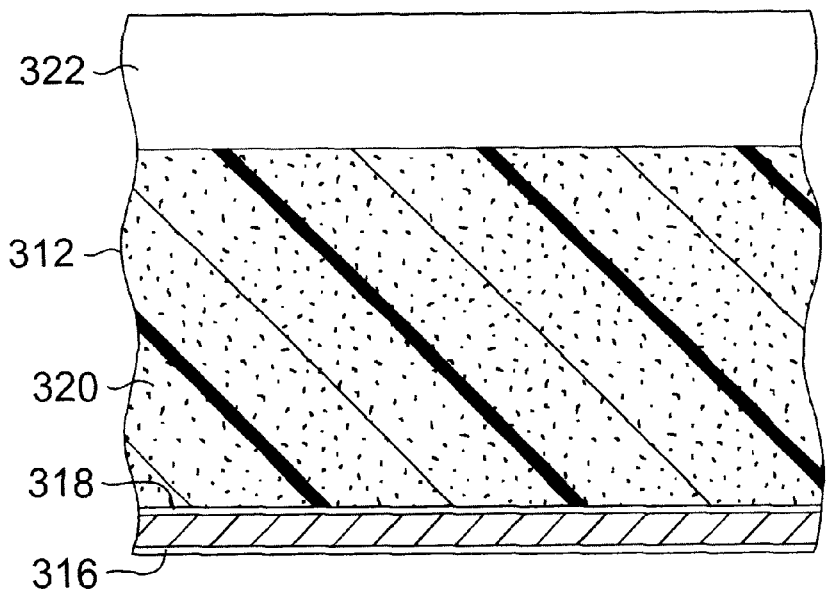
FIGS. 3–4 shows examples of a flexible mirror sheet that may be employed in a mirror constructed in accordance with the present invention.

FIG. 3 shows one example of a flexible mirror sheet that may be employed in the present invention. As shown, the mirror sheet is of a laminated construction including a first reflective layer 316, a second intermediate layer 318, and a third backing layer 320. The reflective layer 316 is constructed of a metallic film, such as chrome, coated on a plastic carrier material. Such a material is commercially available under the trademark Mylar. The intermediate layer 318 is preferably formed of a thin flexible plastic material. The intermediate layer 318 provides sufficient stiffness to prevent the reflective layer 316 from becoming damaged from sharp bends and creasing. The backing layer 320 is preferably formed from a poly foam material such as polyurethane. The layers 316, 318 and 320 may be bonded to one another by any suitable means, such as a latex-base contact cement.

Figure 4:
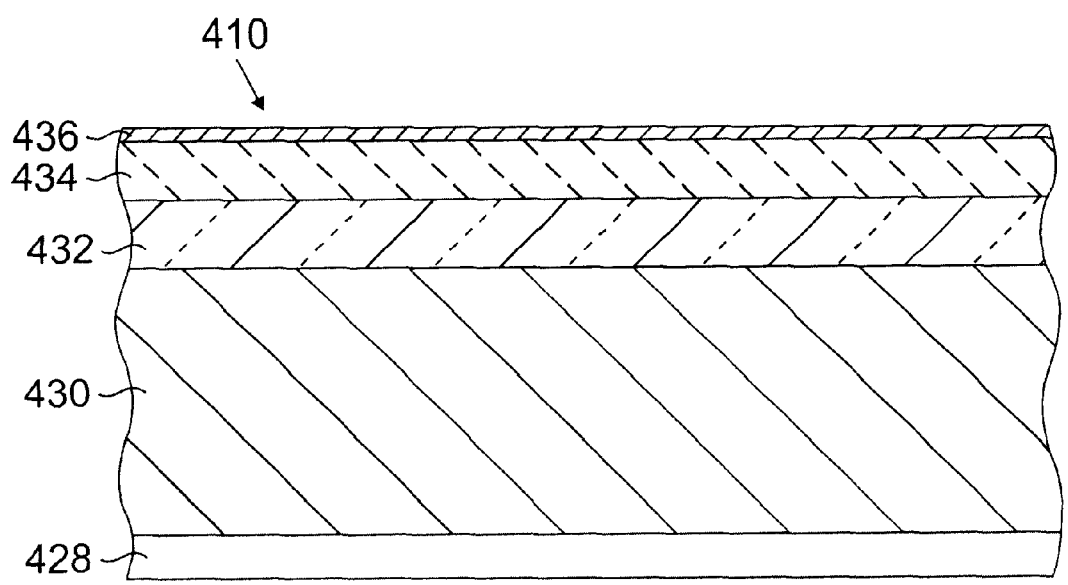

FIG. 4 shows another example of a flexible mirror sheet that may be employed in the present invention. This mirror includes a metallic sheet 430 on which a series of thin film layers are deposited. The flexible metallic sheet 430 may be rolled stainless steel, aluminum or copper foil. In some cases a plastic polymer sheet may replace metallic sheet 430. A smooth, planar-surfaced layer 432, such as silicon dioxide or a ceramic coats the rougher surface of the metallic sheet 430. The thin, metallic sheet 430 and planar-surfaced layer 432 form the lightweight, flexible, substrate for the flexible mirror sheet. A thin film of silicon nitride 434 is then deposited on the planar surface of the silicon dioxide layer 432, followed by a thin film, reflective, silver layer 436. Therefore, the silicon nitride layer 434 is sandwiched between the silver layer 436 and silicon dioxide layer 432. The silicon nitride layer 434 effectively passivates the silver/silicon dioxide interface by isolating those materials from each other.

Flexible mirror sheets that may be employed in the present invention are currently available. For instance, such a flexible mirror sheet is available from the 3M Company.

The flexible mirror sheet may be laminated to the glass substrate, illustrated in FIG. 3 as substrate 322 and in FIG. 4 as substrate 428, by any known laminating technique. Lamination machines that are suitable for use in manufacturing the present invention are available. A commercially available adhesive or glue may used to affix the together the two components of the laminate. The adhesive may be pressure sensitive, heat curable, UV curable or curable in some other manner. Adhesive resins that are UV curable may be particularly advantageous because they do not include any solvents that would need to be removed, nor do they require heat, which could damage the flexible mirror sheet.

What is claimed is:

1. A video projection device comprising:
   a cabinet with front and rear sections,
   a projection tube for projecting a video image,
   a screen located in the front section of the cabinet, the screen having a first surface onto which the video image is projected and a second surface for displaying the video image so that it is observable by a viewer, and
   a mirror arranged in the cabinet for reflecting light to the first surface of the screen,
      wherein said mirror is a composite laminate mirror that includes a rigid substrate and a prefabricated laminate reflective sheet, said prefabricated laminate reflective sheet comprised of a plurality of sheets of material, each sheet individually prefabricated prior to being laminated together to form said prefabricated laminate reflective sheet, said prefabricated laminate reflective sheet being laminated with an adhesive to said rigid substrate.

2. The video projection device of claim 1 wherein the rigid substrate is a glass substrate.

3. The video projection device of claim 1 wherein the reflective sheet is a flexible plastic sheet.

4. The video projection device of claim 1 wherein the reflective sheet has a multilayer construction.

5. The video projection device of claim 4 wherein the reflective sheet includes a metallic film.

6. The video projection device of claim 5 wherein said metallic film is Mylar™.

7. The video projection device of claim 4 wherein the multilayer construction is a multilayer laminate comprising at least a first reflective layer and a supporting layer supplying stiffness to said first reflective layer.

8. The video projection device of claim 7, wherein said multilayer laminate further includes a backing layer laminated to said supporting layer.

9. The video projection device of claim 8 wherein said backing layer is formed from a poly-foam material.

10. The video projection device of claim 9 wherein said poly-foam material is polyurethane.

11. The video projection device of claim 7 further comprising a latex-based based contact cement bonding said first reflective layer to said supporting layer.

12. The video projection device of claim 4 wherein the reflective sheet further includes a plastic layer on which the metallic film is applied.

13. The video projection device of claim 12 wherein said metallic film includes chrome.

14. The video projection device of claim 1 wherein said adhesive is heat curable.

15. The video projection device of claim 1 wherein said adhesive is UV curable.

16. The video projection device of claim 1 wherein said reflective sheet includes a second substrate and at least one thin film layer deposited on said second substrate.

17. The video projection device of claim 16 wherein said second substrate is a metallic sheet.

18. The video projection device of claim 17 wherein said metallic sheet is a rolled metal sheet.

19. The video projection device of claim 17 wherein said second substrate is a plastic sheet.

20. The video projection device of claim 16 wherein said at least one thin film layer includes a silver layer.

21. The video projection device of claim 16 further comprising a thin film silicon dioxide layer deposited on said substrate.

22. The video projection device of claim 21 further comprising a passivating layer deposited on said silicon dioxide layer.

23. The video projection device of claim 22 wherein said passivating layer is silicon nitride.

24. The video projection device of claim 23 further comprising a thin film silver layer deposited over said silicon nitride layer.

25. The video projection device of claim 22 further comprising a thin film silver layer deposited over said silicon dioxide layer.

26. The video projection device of claim 22 further comprising a thin film silver layer deposited over said passivating layer.

* * * * *

UNITED STATES PATENT AND TRADEMARK OFFICE
CERTIFICATE OF CORRECTION

PATENT NO. : 6,554,438 B2
DATED : April 29, 2003
INVENTOR(S) : Fusao Ishii et al.

It is certified that error appears in the above-identified patent and that said Letters Patent is hereby corrected as shown below:

Column 1,
Line 12, before the "Background of the Invention" section, insert the following section heading:

-- FIELD OF THE INVENTION --, followed by the following paragraph:
-- This invention relates generally to rear projection television receivers and particularly to the relatively large mirrors used in such projection receivers --.
Line 19, after "magnified", insert -- ) -- .
Line 27, before "to a cabinet", delete "frame is secured".
Line 30, after "secured", change "int" to -- in --.

Column 4,
Line 6, after "affix", delete "the".
Line 54, after "latex-based", delete "based".

Signed and Sealed this

Sixteenth Day of September, 2003

JAMES E. ROGAN
*Director of the United States Patent and Trademark Office*